(12) United States Patent
Seo et al.

(10) Patent No.: US 9,423,910 B2
(45) Date of Patent: Aug. 23, 2016

(54) DISPLAY DEVICE HAVING PATTERN AND METHOD OF DETECTING PIXEL POSITION THEREIN

(71) Applicant: Samsung Electronics Co., Ltd., Gyeonggi-do (KR)

(72) Inventors: Seong-Min Seo, Gyeonggi-do (KR); Kang-Nam Kim, Gyeonggi-do (KR); In-Kuk Yun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 57 days.

(21) Appl. No.: 14/095,576

(22) Filed: Dec. 3, 2013

(65) Prior Publication Data

US 2014/0152626 A1 Jun. 5, 2014

(30) Foreign Application Priority Data

Dec. 3, 2012 (KR) .................. 10-2012-0139080

(51) Int. Cl.
*G06F 3/041* (2006.01)
*G06F 3/0354* (2013.01)

(52) U.S. Cl.
CPC .......... *G06F 3/0418* (2013.01); *G06F 3/03542* (2013.01); *G06F 3/0412* (2013.01)

(58) Field of Classification Search
CPC combination set(s) only.
See application file for complete search history.

(56) References Cited

U.S. PATENT DOCUMENTS

| 5,742,260 | A | * | 4/1998 | Fishman | ................. H04L 1/004 345/2.3 |
|---|---|---|---|---|---|
| 6,219,775 | B1 | * | 4/2001 | Wade | ................ G06F 15/17381 712/10 |
| 6,597,427 | B1 | * | 7/2003 | Katsu | .................. G02F 1/13338 349/192 |
| 2007/0188417 | A1 | * | 8/2007 | Hajjar et al. | ................. 345/75.1 |
| 2009/0267921 | A1 | * | 10/2009 | Pryor | ............................ 345/177 |
| 2013/0082907 | A1 | | 4/2013 | Yun et al. | |

FOREIGN PATENT DOCUMENTS

KR 1020130035144 4/2013

* cited by examiner

*Primary Examiner* — Van Chow
(74) *Attorney, Agent, or Firm* — The Farrell Law Firm, P.C.

(57) ABSTRACT

A display device and method having a pattern are provided. The display device includes a plurality of color filters which correspond to one or more sub-pixels constituting a pixel of the display device; and a black matrix formed between the plurality of color filters, wherein the one or more sub-pixels include one or more position marks indicating an absolute position of each pixel of the display device and one or more error correction marks for correcting an error when the one or more position marks are detected.

12 Claims, 9 Drawing Sheets

H4 = modulo 15(Y3+X3)
H3 = modulo 15(Y2+X2+Y1)
H2 = modulo 15(Y3+Y2+X2+X1)
H1 = modulo 15(X3+Y2+Y1+X1)

P1 = modulo 15(Y3+X3+H4+Y2+X2+Y1+H3+X1+H2+H1)

$C4 = \text{modulo } 15(H4-(Y3+X3))$ , if not 0, $c_4 = 1$
$C3 = \text{modulo } 15(H3-(Y2+X2+Y1))$ , if not 0, $c_3 = 1$
$C2 = \text{modulo } 15(H2-(Y3+Y2+X2+X1))$ , if not 0, $c_2 = 1$
$C1 = \text{modulo } 15(H1-(X3+Y2+Y1+X1))$ , if not 0, $c_1 = 1$ Correct bit = $c_4 c_3 c_2 c_{1(2)}$ , (Should be $\le 10_{(10)}$)

FIG.10

| BIT NO. | 10 | 9 | 8 | 7 | 6 | 5 | 4 | 3 | 2 | 1 |
|---|---|---|---|---|---|---|---|---|---|---|
| SUB-PIXEL | Y3 | X3 | H4 | Y2 | X2 | Y1 | H3 | X1 | H2 | H1 |
| HAMMING CODE | 1 | 0 | 1 | 0 | 1 | 1 | 2 | 1 | 3 | 2 |

FIG.11

| BIT NO. | 10 | 9 | 8 | 7 | 6 | 5 | 4 | 3 | 2 | 1 | PARITY CHECK |
|---|---|---|---|---|---|---|---|---|---|---|---|
| HAMMING CODE | 1 | 0 | 1 | 0 | 5 | 1 | 2 | 1 | 3 | 2 | |
| $c_4$ | 1 | 0 | 1 | | | | | | | | 0 |
| $c_3$ | | | | 0 | 5 | 1 | 2 | | | | 1 |
| $c_2$ | 1 | | | 0 | 5 | | | 1 | 3 | | 1 |
| $c_1$ | | 0 | | 0 | | 1 | | 1 | | 2 | 0 |

DISPLAY DEVICE HAVING PATTERN AND METHOD OF DETECTING PIXEL POSITION THEREIN

PRIORITY

This application claims priority under 35 U.S.C. §119(a) to Korean Patent Application Serial No. 10-2012-0139080, which was filed in the Korean Intellectual Property Office on Dec. 3, 2012, the entire disclosure of which is incorporated herein by reference.

BACKGROUND OF THE INVENTION

1. Field of the Invention

The present invention relates to a display device, and more particularly, to a display device having a pattern and a method of detecting a pixel position therein.

2. Description of the Related Art

With the development of display technologies, various kinds of display devices have progressed not only as simple display devices but also as bi-directional entertainment devices capable of communicating with a user. Accordingly, various devices are being developed which can recognize a touch when the user directly touches a display screen or performs a motion corresponding to the touch by using a finger gesture or a touch pen.

SUMMARY OF THE INVENTION

The present invention has been made to address at least the problems and disadvantages described above, and to provide at least the advantages described below. Accordingly, an aspect of the present invention is to provide a display device having a pattern and a method of detecting a position of a pixel in the display device, which obtains an accurate coordinate value by correcting an error although the error occurs when a mark is detected.

Another aspect of the present invention is to provide a display device having a pattern and a method of detecting a position of a pixel in the display device, in which the pattern includes an error correction mark in order to correct an incorrect coordinate value which is caused by a failure of detecting a mark when a detection of the mark in one of twelve sub-pixels is failed.

Still another aspect of the present invention is to provide a display device having a pattern and a method of detecting a position of a pixel in the display device, in which the pattern includes an error correction mark in order to correct an incorrect coordinate value which is caused by a failure of detecting a mark when a detection of the mark in plural sub-pixels is failed.

In accordance with an aspect of the present invention, a display device having a pattern is provided. The display device includes a plurality of color filters which correspond to one or more sub-pixels constituting a pixel of the display device; and a black matrix formed between the plurality of color filters, wherein the one or more sub-pixels include one or more position marks indicating an absolute position of each pixel of the display device and one or more error correction marks for correcting an error when the one or more position marks are detected.

In accordance with another aspect of the present invention, a method of detecting a position of a pixel in a display device having a pattern is provided. The method includes receiving an input of a display screen image captured by a camera to extract an effective pattern area for recognition of a pattern from the display screen image; detecting sub-pixels included in the effective pattern area so as to determine sub-pixels including one or more position marks and error correction marks; determining a sub-pixel in which an error occurs among sub-pixels including the position marks by using the sub-pixels including the position marks and the error correction marks; correcting the error of the sub-pixel in which the error occurs; and calculating a display coordinate by using the position marks included in the sub-pixels.

BRIEF DESCRIPTION OF THE DRAWINGS

The above and other aspects, features, and advantages of the present invention will be more apparent from the following detailed description taken in conjunction with the accompanying drawings, in which:

FIG. 10 is a view illustrating an equation used for generating other error correction marks according to the embodiment of the present invention;

FIG. 11 is a view illustrating a table indicating bits and Hamming code of ten sub-pixels which include error correction marks and position marks according to the embodiment of the present invention;

FIG. 12 is a view illustrating a table indicating a parity checking method using a value of an error correction bit according to the embodiment of the present invention;

DETAILED DESCRIPTION OF EMBODIMENTS OF THE PRESENT INVENTION

Figure 1A:
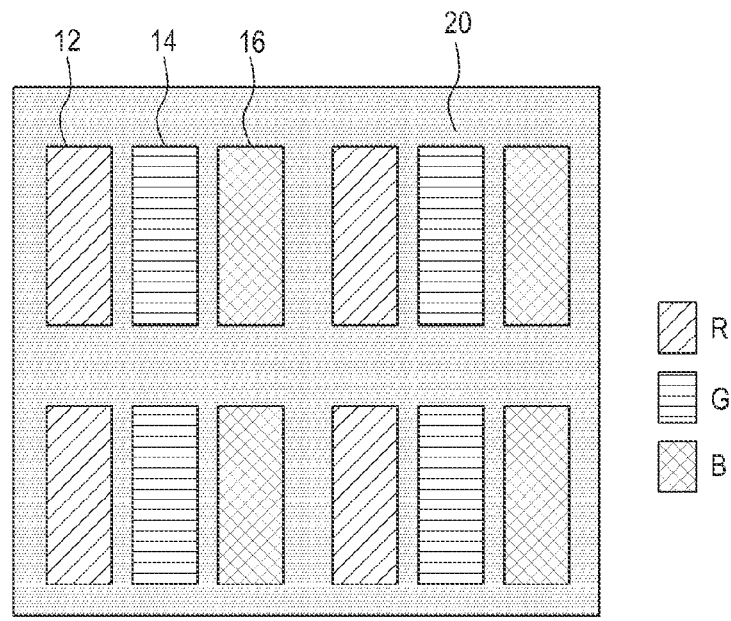
FIGS. 1A and 1B are views illustrating a pattern on a display panel according to the embodiment of the present invention.

Hereinafter, various embodiments of the present invention will be described with reference to the accompanying drawings. This invention may, however, be embodied in many different forms and should not be construed as limited to the embodiments set forth herein. Rather, these embodiments are provided so that the description of this invention will be thorough and complete, and will fully convey the scope of the invention to those skilled in the art. Various specific definitions found in the following description are provided only to provide a general understanding of the present invention. It should be apparent to those skilled in the art that the present invention can be implemented without such definitions. Further, a detailed description of known functions and configurations incorporated herein will be omitted when it may make the subject matter of the present invention unclear.

The present invention provides a display device which has a pattern indicating a position of a pixel on a display panel. Particularly, a display device including a pattern of the present invention has the characteristic of a pattern which includes an error correction mark. Accordingly, the present invention enables an electronic pen to detect patterns formed on sub-pixels of the display device through a camera and to correct an error using an error correction mark even though an error occurs when an input position and gesture information are decoded by using the detected pattern, thereby making it possible for the electronic pen can recognize an accurate pattern.

The display device to which the present invention is applied may include any device which has pixels constituted of sub-pixels, such as a Liquid Crystal Display (LCD) panel, a Plasma Display Panel (PDP), an Organic Light-Emitting Display (OLED) panel, an electronic paper and the like. In the description, a structure and an operational principle of the LCD panel to which the present invention is applied will be described as an example.

As an input method in a display device, the present invention provides a method of sensing a position on a display screen by recognizing a pattern so as to perform an input according to the position. In the input method using the pattern recognition, a pattern displayed on the display screen is recognized by using an input device (hereinafter, referred to as 'an electronic pen') having a camera, and a position of the electronic pen is detected through the pattern recognition so that the input is performed by using a value of the detected position. In such an input method, a camera capturing a movement of a nib of the electronic pen takes a picture of an area in a display screen which the electronic pen indicates, and a predetermined pattern is detected from the captured image, so that a position or an instruction indicated by the electronic pen can be recognized.

For example, in one of the methods using the pattern recognition, one or more marks are provided at a predetermined position in a sub-pixel area including R, G, B and the like, in the display screen in order to display the predetermined pattern, and a pattern shown by the one or more marks may indicate corresponding position information.

According to the embodiment of the present invention, as one of the methods using the pattern recognition, one or more marks are provided at a predetermined position in a sub-pixel area including R, G, B and the like in the display device in order to display the predetermined pattern, and a pattern shown by the one or more marks may indicate corresponding position information. An electronic pen such as a Pattern Recognition (PR) pen and the like captures a picture of a pattern at a specific position on the display panel, and recognizes a corresponding position on the display panel through an analysis of an image of the captured pattern.

Figure 1B:
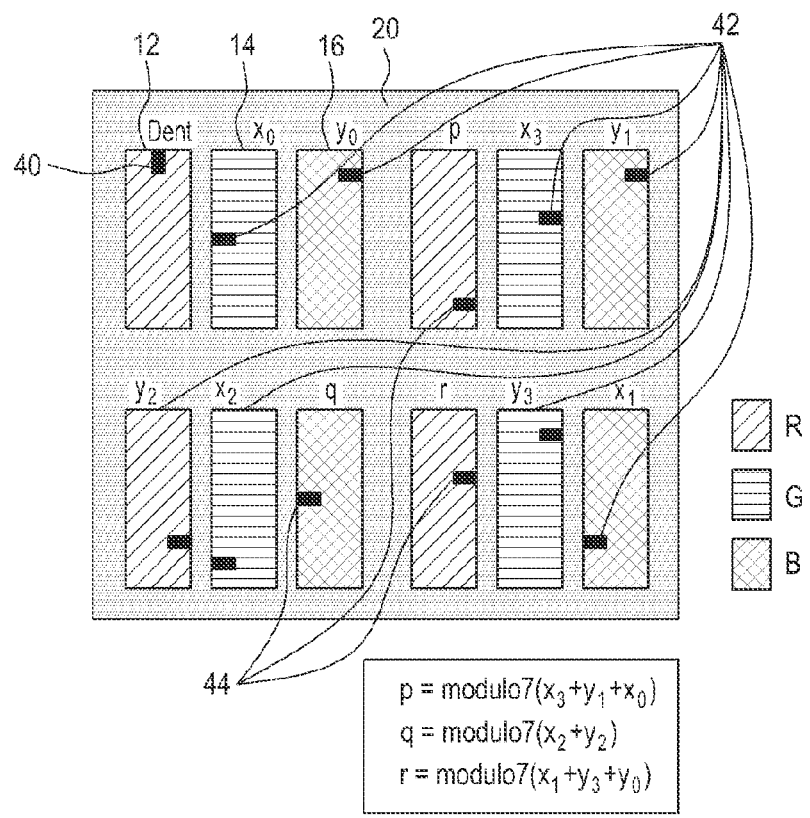

FIGS. 1A and 1B are views illustrating a pattern on a display panel according to the embodiment of the present invention. Referring to FIG. 1A, the display panel is configured to create a pattern to determine a position of a pixel using sub-pixels 12, 14 and 16 and a black matrix 20, to detect the position of the pixel through a device, e.g. an electronic pen and the like, capable of photographing and decoding the pattern, and to recognize an input position of the electronic pen and an input of a gesture by using the detected position. Referring to FIG. 1B, particularly, a sub-pixel of R, G and B includes one or more marks at a certain position therein according to a predetermined pattern type in order to determine the position of the pixel. As shown in FIG. 1B, for example, in the case of a 2×2 reference pixel, patterns may be formed in twelve sub-pixels included in the pixels in order to indicate an absolute position of each of the 2×2 pixels. In FIG. 1B, as an example, one or more marks are shown which indicate patterns corresponding to values of the absolute positions of the pixels in the display device which supports a maximum resolution of 4802×2744 based on a value of an X coordinate (landscape) a Y coordinate (portrait). One or more marks include a dent mark 40 for indicating a reference to calculate a value of the absolute position of the pixel, position marks 42 for displaying a value of an X coordinate and a value of a Y coordinate on a display device, and parity marks 44 for determining an error of the values of the X coordinate and the Y coordinate.

First, the dent mark 40 may be formed in one sub-pixel in order to indicate the reference to calculate the value of the absolute position of the pixel. Further, seven septenary numerals X0, X1, X2, X3, Y1, Y2 and Y3 and one quaternary numeral Y0 may be used as the value of the X coordinate and the value of the Y coordinate, respectively, in order to support the maximum resolution of 4802×2744. The values of the X and Y coordinates are expressed by using seven septenary numerals X0, X1, X2, X3, Y1, Y2 and Y3 and one quaternary numeral Y0 as follows in Equation (1):

$$\text{Value of } X \text{ coordinate} = 7^3 \times X3 + 7^2 \times X2 + 7 \times X1 + X0$$

$$\text{Value of } Y \text{ coordinate} = 7^2 \times 4 \times Y3 + 7 \times 4 \times Y2 + 4 \times Y1 + Y0 \qquad (1)$$

Further, in order to determine whether the positions at which a mark of the X coordinate and a mark of the Y coordinate are detected are accurate, i.e. a presence or an absence of an error, the parity marks 44 may be formed at any one of seven points in three sub-pixels p, q and r by applying a parity checking technique. The values (parity bits) of p, q and r may be calculated by the equations in Equation (2) below:

$$p = \text{modulo } 7(X3+Y1+X0)$$

$$q = \text{modulo } 7(X2+Y2)$$

$$r = \text{modulo } 7(X1+Y3+Y0) \qquad (2)$$

The value of the sub-pixel p is a criterion for determining an error for values of X3, Y1 and X0, and the value of the sub-pixel q is a criterion for determining an error for values of X2 and Y2. Further, the value of the sub-pixel r is a criterion for determining an error for values of X1, Y3 and Y0. In other words, the sub-pixels p, q and r are determined in which errors occur when a result value of a modulo calculation is different from a value of the parity mark.

That is, as described above, the pattern according to the embodiment of the present invention is created by positioning marks at seven positions in each sub-pixel by using the septenary numeral system and the dent mark at one separate position. Thus, the position of each sub-pixel can be determined through the pattern. As described above, for example, in the pattern using the septenary numeral system according to the embodiment of the present invention, the marks may be formed at eight positions in each sub-pixel, as shown in FIG. 2.

Figure 2:
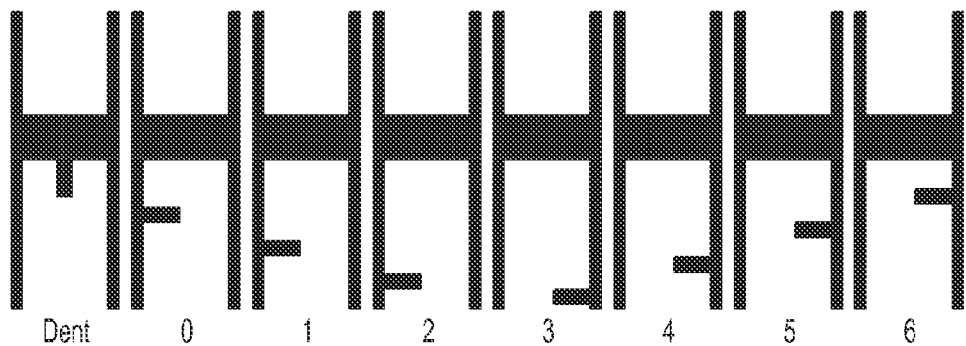
FIG. 2 is a view illustrating an example of arrangement of marks in a pattern using a septenary numeral system according to the embodiment of the present invention.

FIG. 2 is a view illustrating an example of arrangement of marks in a pattern using the septenary numeral system according to the embodiment of the present invention. Referring to FIG. 2, the marks may be formed at a position indicating the dent mark and positions indicating 0, 1, 2, 3, 4, 5 and 6 respectively. However, the marks in the pattern described above are constituted of the same component as black matrixes, which are regions not emitting light. Accordingly, the marks may be viewed as black dots between the sub-pixels emitting light, and cause pattern noise. That is, since the marks fail to be evenly distributed in a whole area of each sub-pixel and are concentrated only to a specific portion in each sub-pixel, there is a problem in that pattern noise occurs in which the amount of light emitted from the sub-pixels is changed according to an angle at which a user views a screen of the display device. Therefore, a four mark typed pattern is provided in which marks of each sub-pixel are symmetric to upper, lower, left and right sides of a pattern.

Figure 3:
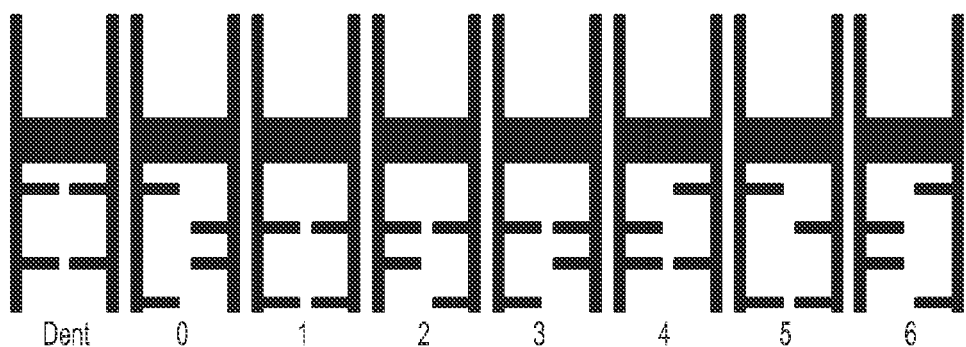
FIG. 3 is a view illustrating an example of arrangement of four marks in a pattern using a septenary numeral system according to the embodiment of the present invention.

FIG. 3 is a view illustrating an example of arrangement of four marks in a pattern using septenary numeral system according to the embodiment of the present invention. Referring to FIG. 3, the four mark typed pattern includes marks which are symmetric to marks positioned at any one of upper, lower, left and right sides of the pattern respectively, in order to reduce a difference of brightness when the marks are viewed in directions of the upper, lower, left and right sides of the pattern. Referring to FIG. 3, the four mark typed pattern includes two marks which are symmetric to each other at the left and right sides thereof, and two marks which are symmetric to each other at the upper and lower sides thereof, resulting in including four marks which are positioned at the upper, lower, left and right sides thereof respectively. In the four mark typed pattern, the difference of brightness between the left and right sides can be reduced, and in addition, the difference of brightness between the upper and lower sides can be reduced, thereby decreasing the pattern noise.

However, the pattern according to the embodiment of the present invention as described above has a problem in that an error can be detected but cannot be corrected.

That is, even though the pattern on a surface of the display device is photographed by means of the electronic pen, and each mark is detected from a pattern image and is converted into a value of the X coordinate and a value of the Y coordinate, the presence or the absence of an error in the values of the X and Y coordinates is determined simply by using the parity marks, and the error in the values of the X and Y coordinates cannot be corrected.

For example, in the case that the electronic pen is inclined or rapidly moved to capture a picture of a pattern on the surface of the display device, when the lens of the electronic pen fails to focus on a subject to photograph or a photographed image is indistinct, the electronic pen has a difficulty in detecting marks from the photographed image and causes an error. In the case of the pattern described above, when the detection of the marks fails even in one of twelve sub-pixels, a value of a coordinate cannot be obtained. Further, although the detection of the marks for the plural sub-pixels fails, it accidently meets a parity formula so that the value of the coordinate can be obtained. In this case, the value of the coordinate is false. Accordingly, a position of the pattern cannot be sensed by using the false coordinate value. Therefore, a pattern capable of providing an accurate coordinate value is required.

Figure 4:
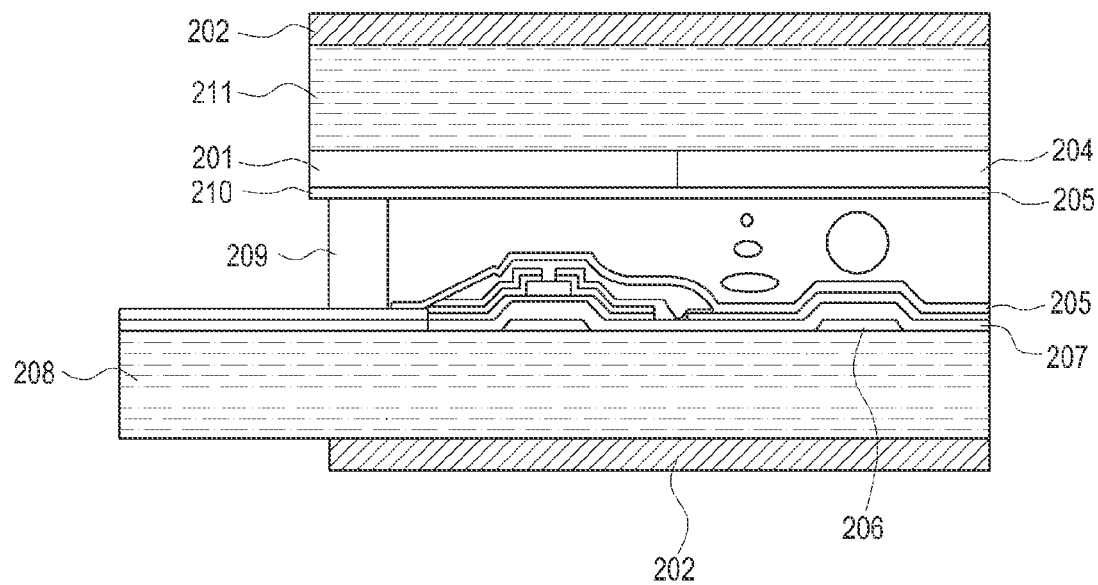
FIG. 4 is a sectional view illustrating a liquid crystal panel of a display device to which the present invention is applied.

FIG. 4 is a sectional view illustrating a liquid crystal display panel of a display device to which the present invention is applied. Referring to FIG. 4, the LCD panel has a front polarizing plate 202 disposed on a surface thereof, a color filtering substrate 211 disposed under the front polarizing plate 202, and a black matrix 201 and a color filter 204 which are disposed below the color filtering substrate 211. A Thin Film Transistor (TFT) substrate is located below the black matrix 201 and the color filter 204. As shown in FIG. 4, the TFT substrate includes a common electrode 210 and a pixel electrode 207 arranged on a TFT-array substrate 208, and two alignment layers 205, a spacer 203, a storage capacitance, and a sealant 209 which are arranged between the common electrode 210 and the pixel electrode 207. A rear polarizing plate 202 is disposed below the TFT-array substrate 208.

According to the characteristics of the present invention, the black matrix indicating a boundary between the color filters 204 includes a substance or a structure which is capable of absorbing light, or a substrate or a structure which is capable of selectively reflecting light. If the light source of the electronic pen generates Infrared Rays (IR), the black matrix 201 may be made from carbon black capable of absorbing the IR. Further, the color filter 204 may be constituted of a Red (R) color filter, a Green (G) color filter, and a Blue (B) color filter. The R, G and B color filters may correspond to the sub-pixels respectively, and a set of the R, G and B color filters may correspond to one pixel.

According to the embodiment of the present invention, the display panel, i.e. the display device, includes one or more marks at a specific position in the sub-pixels which indicate a desired pattern. The position of a pixel can thus be determined by using the sub-pixels and the black matrix. Thus, the display device may have the pattern. According to the embodiment of the present invention, the marks are formed in such a manner that the black matrix 201 is introduced into an area of each of the R, G and B sub-pixels, and may be made from the same material as the black matrix. Further, the marks may be made from other substances which may be recognized as a pattern in the R, G and B area, and are formed at predetermined positions.

At least one mark indicating the desired pattern may be formed at the position to indicate a coordinate corresponding to a position of a pixel. The mark may have various shapes such as an equilateral triangle, a rectangle and the like, and also may be changeable in size. The shape and size of the mark may be changed according to a use of the display panel and the electronic pen.

In other words, one or more marks are used to indicate the coordinate corresponding to the position of a pixel, and are displayed in the form of pattern on the display panel. An electronic pen, such as a Pattern Recognition (PR) pen and the like, captures a picture of a pattern on the display panel, and recognizes a corresponding position on the display panel through an analysis of an image of the captured pattern.

However, in the case where the positions of the marks of each sub-pixel are arranged asymmetrically, when a user views the display device in the upper, lower, left and right directions, dot noise occurs due to a difference of brightness, resulting in a deterioration of image quality.

Accordingly, in the embodiment of the present invention, a four mark type method is used in which the marks are disposed at four positions of each sub-pixel, i.e. upper left, upper right, lower left and lower right, respectively, of which two marks are symmetrically arranged at left and right sides and two marks are symmetrically arranged at upper and lower sides, so that the four marks are positioned at upper, lower, left and right sides of each sub-pixel one by one.

Particularly, in a structure of one sub-pixel in which marks are formed at eight positions including two positions on upper left side, two positions on lower left side, two positions on upper right side, and two positions on lower right side, the four mark type method is used which includes two marks on the left and right sides which are symmetric to each other and two marks on the upper and lower sides which are symmetric to each other, so that the four marks are arranged on the upper, lower, left and right sides of the sub-pixel one by one.

If such a four mark type method is used, sixteen mark arrangements may be created in one sub-pixel. In the embodiment of the present invention, one of the sixteen mark arrangements is used as a dent mark, and fifteen remaining mark arrangements are used to create a value of a coordinate. According to the embodiment of the present invention, the fifteen mark arrangements are implemented by using a pentadecimal numeral system.

Figure 5:
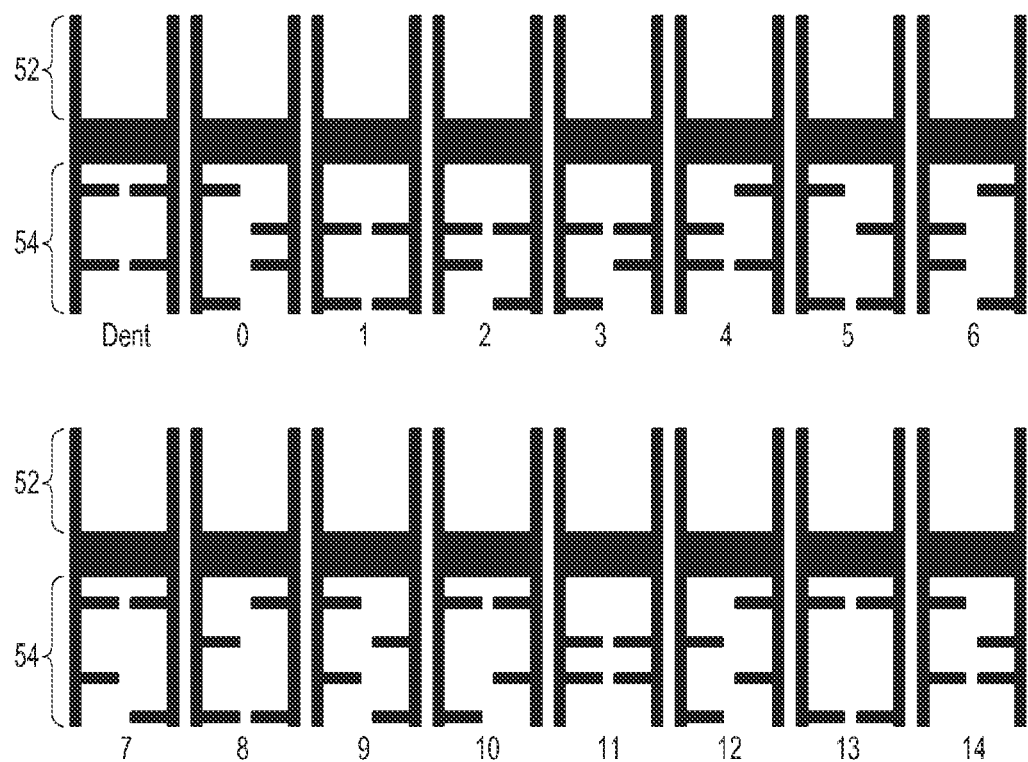
FIG. 5 is a view illustrating an example of arrangement of marks in a pattern using a pentadecimal numeral system according to the embodiment of the present invention.

FIG. 5 is a view illustrating an example of arrangements of marks in a pattern using a pentadecimal numeral system according to the embodiment of the present invention. In FIG. 5, sub-pixels divided into upper and lower portions, respectively, are shown. The sub-pixels may be divided based on a predetermined proportion. A reference numeral 52 indicates the upper portion of the sub-pixels, and a reference numeral 54 denotes the lower portion of the sub-pixels. Each of the upper portion 52 and the lower portion 54 of the sub-pixels expresses a range of different colors. For example, if the sub-pixel has a red color component, the upper portion 52 expresses colors designated by 0~150 in a total color range of 0~255, while the lower portion 54 expresses colors designated by 151~255. In other words, only the upper portion 52 of the sub-pixel is used to express the colors designated by 0~150, while both the upper portion 52 and the lower portion 54 are used to express the colors designated by 151~255. As described above, in the case that the display device includes the sub-pixels which are divided into the upper portion 52 and the lower portion 54, respectively, the marks are preferably arranged on the lower portion 54. The reason for that is because the lower portion 54 is used less than the upper portion 52 so that the marks have a small effect on light, and the upper portion 52 expresses relatively dark color in comparison with the lower portion 54, in which the relative amount of light is significantly changed depending on the position of the mark so as to cause pattern noise when the lower portion expresses dark colors rather than bright colors.

Referring to FIG. 5, in the embodiment of the present invention, one of the sixteen mark arrangements in the sub-pixel is used as the dent mark, and the fifteen mark arrangements are used to indicate coordinate values designated by 0~14.

In the present invention, a value of an X coordinate and a value of a Y coordinate are indicated by using the fifteen mark arrangements. Particularly, since one sub-pixel may include any one of the fifteen mark arrangements, the sub-pixel can indicate fifteen coordinate values. If two sub-pixels are used, total coordinate values of 225 (15*15) can be expressed. Further, if three sub-pixels are used, total coordinate values of 3375 (15*15*15) can be indicated.

In the present invention, with relation to 2×2 pixels, an example of creating coordinate values of 6759 (3375*2) by using three sub-pixels among the sub-pixels to indicate a value of an X coordinate and a value of a Y coordinate will be described.

Figure 6:
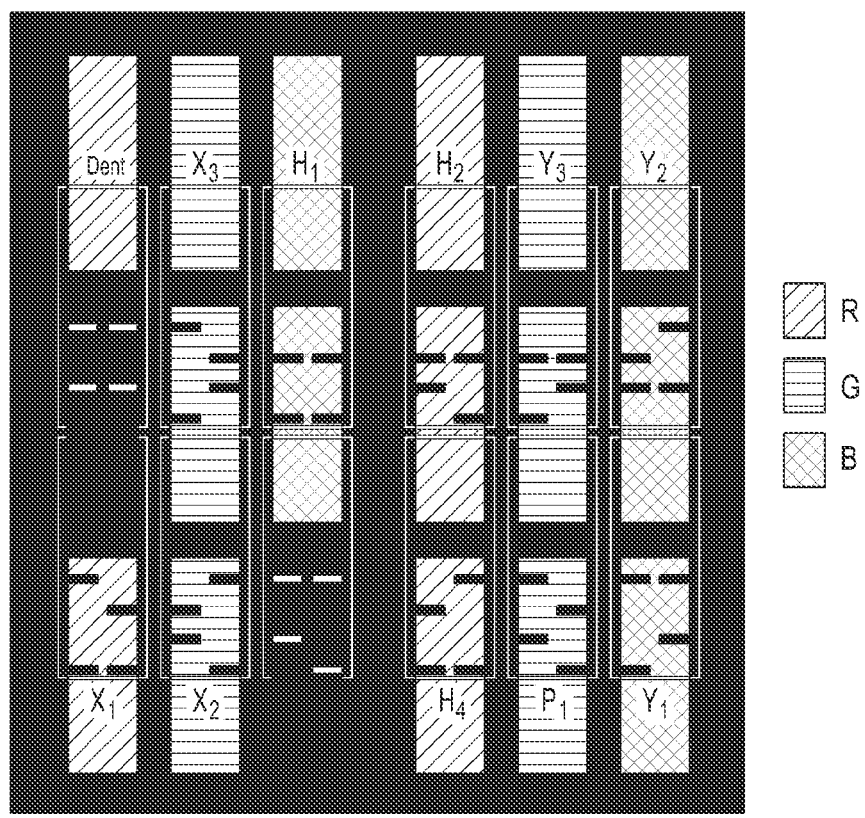
FIG. 6 is a view illustrating a pattern structure of a 2×2 pixel base including an error correction mark according to the embodiment of the present invention.

FIG. 6 is a view illustrating a reference pattern structure of a 2×2 pixel base including an error correction mark according to the embodiment of the present invention. Referring to FIG. 6, the 2×2 pixel has twelve sub-pixels including three sub-pixels X1, X2 and X3 of an X coordinate which include marks indicating the value of the X coordinate, three sub-pixels Y1, Y2 and Y3 of a Y coordinate which include marks indicating the value of the Y coordinate, four error correction sub-pixels H1, H2, H3 and H4 which include error correction marks for detecting and correcting error of marks included in each sub-pixel, and one parity sub-pixel P1 including parity marks.

According to the embodiment of the present invention, the four error correction sub-pixels H1, H2, H3 and H4 include error correction marks for correcting marks of any one sub-pixel when the marks included in the sub-pixel among six sub-pixels indicating the values of the X and Y coordinates are abnormally detected.

The value of the error correction marks may be determined by a Hamming code principle. The Hamming code principle states that a relation of data bit k with parity bit m is expressed by a formula, i.e. $2m \geq k+m+1$, in which three parity bits are required as a minimum to create Hamming codes using four parity data bits. If such a Hamming code principle is used, three error correction marks are necessary for detection and correction of error in the four sub-pixels. In the embodiment of the present invention, since the detection and the correction of an error for six sub-pixels are performed, four error correction marks are required as a minimum.

Figures 7, 8:
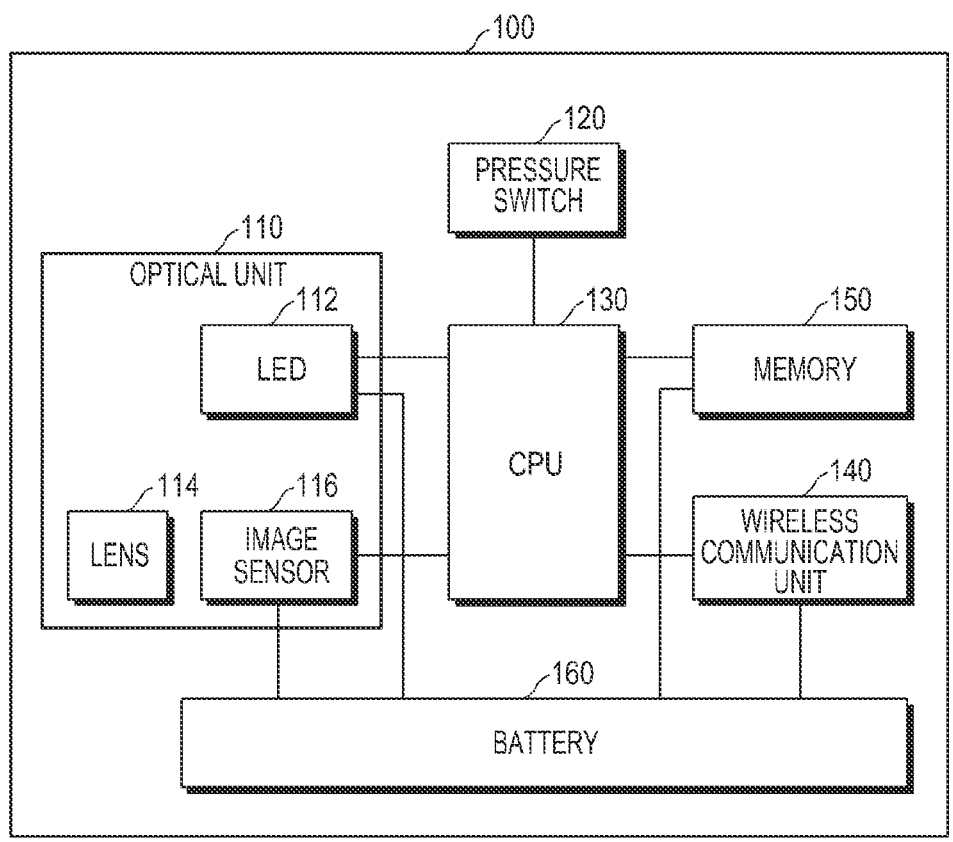
FIG. 7 is a view illustrating an equation used for generating error correction marks according to the embodiment of the present invention.
FIG. 8 is a block diagram illustrating a structure of an electronic pen according to the embodiment of the present invention.

FIG. 7 is a view illustrating an equation used for creating error correction marks according to the embodiment of the present invention. Referring to FIG. 7, the error correction marks are obtained by Equation (3) below:

$H4 = \text{modulo } 15(Y3+X3)$ $H3 = \text{modulo } 15(Y3+X2+Y1)$ $H2 = \text{modulo } 15(Y3+Y2+X2+X1)$ $H1 = \text{modulo } 15(X3+Y2+Y1+X1)$ (3)

As described above, according to the embodiment of the present invention, the 2×2 pixel has a total of twelve sub-pixels, in which the sub-pixels include a sub-pixel having dent marks, three sub-pixels X1, X2 and X3 having position marks to indicate a value of an X coordinate, three sub-pixels Y1, Y2 and Y3 having position marks to indicate a value of a Y coordinate, and four sub-pixels H1, H2, H3 and H4 having error correction marks.

In addition, the twelve sub-pixels further include a parity sub-pixel P1 having parity marks to identify a final parity.

The parity marks may be obtained by Equation (4) below:

$P1 = \text{modulo } 15(Y3+X3+H4+Y2+X2+Y1+H3+X1+H2+H1)$ (4)

By using Equations (3) and (4) as described above, the error correction marks and the parity marks which are capable of detecting and correcting an error can be created when the error occurs in a value of a coordinate in size of 6750×6750.

As described above, in the case that the pattern is formed on the display panel, an input position of an input device, e.g. an electronic pen and the like, may be detected from an image of a display screen obtained by capturing a picture of the display screen, on which light is emitted, with a camera after the electronic pen emits the light in a direction toward the display panel.

Because black matrixes in the display panel are configured to include substance or structure of absorbing light emitted from a light source of the electronic pen, the light emitted from the light source of the electronic pen is absorbed in a black matrix area. Even though the camera captures a picture of the black matrix area in the state that the light source of the electronic pen emits light, the black matrixes are expressed in black in a captured image since the black matrix area absorbs the light. Thus, the input position of the electronic pen can be detected through the image of the display screen.

Furthermore, according to the embodiment of the present invention, since the plural marks included in the sub-pixels also are made from the same substance as the black matrix or a substance capable of absorbing light, they are expressed in black if a picture of them is captured. Therefore, a pattern formed by the black matrix and the plural marks is depicted in the captured image. Since this pattern is one which is predetermined or previously stored in correspondence to a position, it is possible to detect a position to which the captured image corresponds on the display panel, through the recognized pattern.

According to the embodiment of the present invention, the electronic pen uses the pattern including the error correction mark. Thus, although mark detection error for the sub-pixel occurs during the detection of the position using the pattern, the error can be corrected.

FIG. 8 is a block diagram illustrating a structure of an electronic pen according to the embodiment of the present invention. Referring to FIG. 8, the electronic pen 100 according to the embodiment of the present invention includes an optical unit 110, a pressure switch 120, a Central Processing Unit (CPU) 130, a wireless communication unit 140, a memory 150, and a battery 160.

The optical unit 110 includes a Light Emitting Diode (LED) 112, a lens 114, and an image sensor 116, which captures a picture of a display panel and transmits the captured image to the CPU 130. The pressure switch 120 detects an operation of the electronic pen 100 through a change of pressure thereof, and transmits an operation signal to the CPU 130. When the electronic pen 100 operates, the CPU 130 turns on the LED 112, makes the lens 114 operate, obtains a display image captured through the image sensor 116, recognizes a pattern in the obtained display image, extracts a coordinate value indicating a corresponding position by using a coordinate extraction algorithm after recognizing the pattern, decodes the extracted coordinate value, and transmits the decoded coordinate value to the wireless communication unit 140. The wireless communication unit 140 transmits the decoded coordinate value to an external device requiring the corresponding coordinate value. The memory 150 stores programs and data such as the coordinate extraction algorithm and the like, necessary for the present invention. The battery 160 supplies the electronic pen 100 with electric power.

Figure 9:
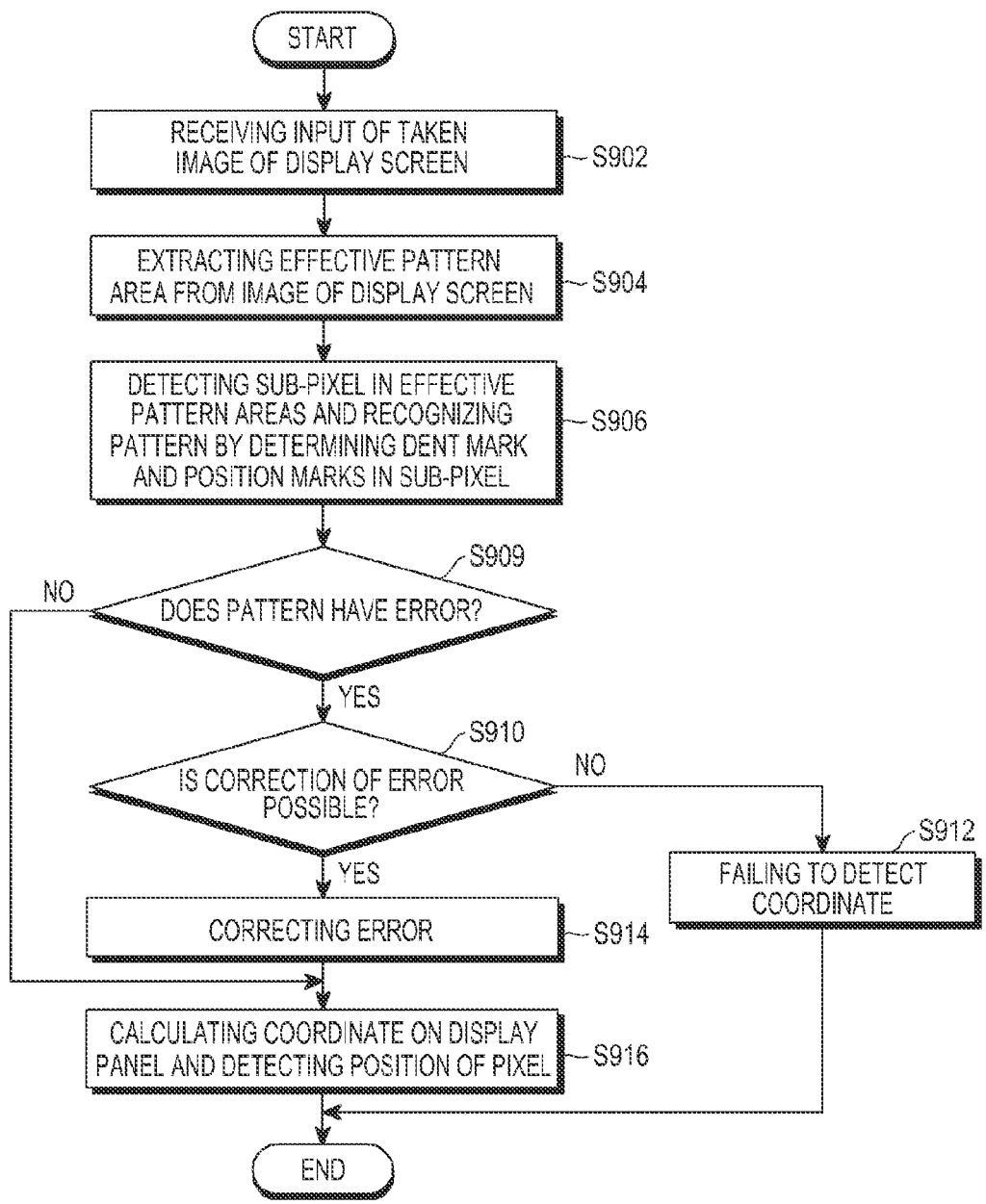
FIG. 9 is a flowchart illustrating a process of detecting a position of a pixel in the electronic pen according to the embodiment of the present invention.

FIG. 9 is a flowchart illustrating a process of detecting a position of a pixel by means of the electronic pen according to the embodiment of the present invention. Referring to FIG. 9, the electronic pen 100 receives an input of an image of a display screen captured by the optical unit 110 in step S902. The captured image of the display screen may include a predetermined pattern indicating a corresponding position. The electronic pen 100 extracts an effective pattern area from the display screen in step S904. The effective pattern area refers to an area, which is used to recognize the pattern, in a whole area of the captured image of the display screen. Particularly, the electronic pen 100 compensates for a distortion, i.e. a rotation angle, caused by a difference between the captured display screen image and the actual display screen image, and detects a black matrix area from the compensated image. Then, the electronic pen 100 extracts an effective pattern area in the size of a predetermined basic pattern block in order to detect a certain position using the black matrix area.

When the effective pattern area is extracted, the electronic pen 100 detects the sub-pixels in the effective pattern area, and normalizes image quality of the sub-pixels, which in turn determines marks in the sub-pixels so as to recognize the pattern in step S906. That is, the electronic pen 100 determines a sub-pixel including dent marks among the twelve sub-pixels, and also determines position marks corresponding to X coordinate values, and position marks, error correction marks and parity marks which correspond to Y coordinate values, in the eleven sub-pixels except for the sub-pixel including the dent marks. The marks obtained from the eleven sub-pixels except for the dent mark have fifteen values, i.e. 0, 1, 2, 3, 4, 5, 6, 7, 8, 9, 10, 11, 12, 13 and 14, as shown in FIG. 15.

After recognizing the pattern, the electronic pen 100 determines whether an error occurs in the pattern, in step S909.

FIG. 10 is a view illustrating an equation used for creating other error correction marks according to the embodiment of the present invention. Referring to FIG. 10, an occurrence of the error may be detected by using Equation (5) below. The electronic pen 100 may determine the occurrence of the error in the pattern according to Equation (5) below:

$$C4 = \text{modulo } 15(H4-(Y3+X3)), \text{ if not } 0, c_4=1$$

$$C3 = \text{modulo } 15(H3-(Y2+X2+Y1)), \text{ if not } 0, c_3=1$$

$$C2 = \text{modulo } 15(H2-(Y3+Y2+X2+X1)), \text{ if not } 0, c_2=1$$

$$C1 = \text{modulo } 15(H1-(X3+Y2+Y1+X1)), \text{ if not } 0, c_1=1 \quad (5)$$

Referring to the Equation (5), when all marks detected from each of ten sub-pixels have no error, excepting for the sub-pixel including the dent marks and the sub-pixel including the parity marks, all values of C1, C2, C3 and C4 become zero (0). However, when the marks detected from each of ten sub-pixels have one or more errors, at least one of C1, C2, C3 and C4 has a value other than zero. Further, when only one sub-pixel has an error, all of C1, C2, C3 and C4 must have an identical value other than zero.

For example, assuming that all values of X1, X2, X3, Y1, Y2 and Y3 are zero, H1, H2, H3 and H4, all values of which are zero, should be created in the sub-pixel. If an error occurs during detection of the marks so that a value of Y2 is detected as 1 and a value of X2 is detected as 1, then C4=0, C3=12, C2=12 and C1=13. In this case, C1, C2 and C3 have different values other than zero. Therefore, it may be known through the values that two or more values are errors. According to the embodiment of the present invention, the occurrence of two or more errors may be detected. In the case that one error occurs, the one error can be corrected.

Referring back to FIG. 9, in the case that an error is present in the pattern, the electronic pen 100 determines whether the correction of the error is possible, in step S910. If the correction of the error is impossible, the electronic pen 100 recognizes failure of detection of a coordinate and finishes the process in step S912. When an error occurs in plural sub-pixels, C1, C2, C3 and C4 may have an identical value other than zero. When an error occurs in the plural sub-pixels and an error correction bit is greater than ten-, the correction of the error is not performed so as to prevent a fault of the error correction.

According to the embodiment of the present invention, when an error occurs in one sub-pixel, a correction of the error is possible. The correction of the error in one sub-pixel is described as an example in the embodiment of the present invention. However, if the number of sub-pixels including the error correction marks is increased, the error occurring in the plural sub-pixels may be corrected. Thus, according to the embodiment, the number of the sub-pixels for which an error can be corrected may be adjusted.

If the correction of the error is possible, the electronic pen 100 detects the sub-pixel in which the error occurs, so as to correct a value of a bit of the sub-pixel in step S914. For example, referring back to FIG. 6, if a sub-pixel Y2 is abnormally detected as 1, C4=0, C3=13, C2=13 and C1=13. Since the C1, C2 and C3 have values other than zero, the electronic pen 100 may carry out the correction of the error. In order to identify which sub-pixel among ten sub-pixels an error occurs in, the electronic pen 100 converts the values of C1, C2, C3 and C4 into values of c1, c2, c3 and c4, and changes the values of c1, c2, c3 and c4 to 0 or 1. That is, c4=0, c3=1, c2=1 and c1=1. The sub-pixel in which an error occurs may be detected by Equation (6) using the values of c1, c2, c3 and c4.

$$\text{Correct bit} = c_4 c_3 c_2 c_{1(2)}, \text{ (Should be} \leq 10_{(10)}) \tag{6}$$

Referring to Equation (6), in the case that Correct bit=0111 (2), the value of the Correct bit becomes seven if it is expressed by a decimal numeral system. That is, it will be understood that a mark detection error occurs in the sub-pixel corresponding to seven among ten sub-pixels.

FIG. 11 is a view illustrating a table indicating bits and Hamming codes of ten sub-pixels which include error correction marks and position marks according to the embodiment of the present invention. Referring to FIG. 11, the sub-pixels H1, H2, H3 and H4 which include the error correction marks, the sub-pixels X1, X2 and X3 which include the position marks indicating the value of the X coordinate, and the sub-pixels Y1, Y2 and Y3 which include the position marks indicating the value of the Y coordinate, may become any one of 1 bit to 10 bits.

The sub-pixels X1, X2 and X3 which include position marks indicating the value of the X coordinate, and the sub-pixels Y1, Y2 and Y3 which include position marks indicating the value of the Y coordinate may have the values of the position marks, respectively. In FIG. 11, a case that the value of the sub-pixel X1 is 1, the value of the sub-pixel X2 is 1, the value of the sub-pixel X3 is 0, the value of the sub-pixel Y1 is 1, the value of the sub-pixel Y2 is 0, and the value of the sub-pixel Y3 is 1 is shown as an example. If the values are expressed by a pentadecimal numeral system, they become 100111(15). If 100111(15) of the pentadecimal numeral system is converted into the Hamming code, it may be expressed by Equation (7) below:

$$H1 = \text{modulo } 15(0+0+1+1) = 2$$

$$H2 = \text{modulo } 15(1+0+1+1) = 3$$

$$H3 = \text{modulo } 15(0+1+1) = 2$$

$$H4 = \text{modulo } 15(1+0) = 1 \tag{7}$$

Values of the Hamming code expressed by Equation (7) may become the values of the sub-pixels H1, H2, H3 and H4 including the error correction marks, respectively. Therefore, the value of the Hamming code of ten sub-pixels including the error correction marks and the position marks according to the embodiment of the present invention may be expressed as 1010112132(15).

However, if an error occurs in a bit No. 6, i.e. the sub-pixel X2, so that the value of the Hamming code of 1 is detected as the Hamming code value of 5, the electronic pen 100 abnormally determines that the Hamming code value of ten sub-pixels including the error correction marks and the position marks is not 1010112132(15) but 1010512132(15).

In order to detect such an error, the electronic pen 100 calculates a value of the error correction bit, i.e. values of c1, c2, c3 and c4 by using Equation (5). In the case that the Hamming code value is 1010512132(15), the values of c1, c2, c3 and c4 can be calculated as Equation (8) when Equation (5) is used.

$$C4 = \text{modulo } 15(1-(1+0)) = 0 \; c4=0$$

$$C3 = \text{modulo } 15(2-(0+5+1)) = 11 \; c3=1$$

$$C2 = \text{modulo } 15(3-(1+0+5+1)) = 11 \; c2=1$$

$$C1 = \text{modulo } 15(2-(0+0+1+1)) = 0 \; c1=0 \tag{8}$$

As described above, after calculating the values of c1, c2, c3 and c4, the electronic pen 100 performs a parity check by using the values of c1, c2, c3 and c4 and detects the sub-pixel in which an error occurs.

FIG. 12 is a view illustrating a table indicating a parity checking method using a value of an error correction bit according to the embodiment of the present invention. Referring to FIG. 12, it will be understood that Correct bit=c4 c3 c2 c1(2)=0110(2). When the value of 0110(2) is expressed by a decimal numeral system, it becomes 6. Accordingly, it may be detected that an error occurs in the sub-pixel X2, which is a sixth bit, among ten sub-pixels.

In order to correct the error occurring in the sub-pixel, the electronic pen 100 calculates the value of the sub-pixel X2 in which an error correction bit becomes zero, i.e. 0000(2). The value of the sub-pixel in which the error correction bit becomes 0000(2) may be 1. Accordingly, the electronic pen 100 corrects the value of the sub-pixel X2 from 5 to 1. In the embodiment of the present invention, an example of correcting the error in the one sub-pixel when an error occurs in one sub-pixel is described. However, errors may occur in plural sub-pixels. If the number of the sub-pixels including the error correction marks is increased, errors occurring in the plural sub-pixels may be corrected. The numbers of the sub-pixels in which the errors can be corrected may be adjusted according to the embodiment.

The errors are corrected as described above, and then the electronic pen 100 calculates display coordinates by using the position marks which are included in the sub-pixels X1, X2, X3, Y1, Y2 and Y3 in which the errors are corrected, so as to detect the position of the pixel in step S916 (see FIG. 9).

If the pattern including the error correction marks according to the embodiment of the present invention is used, the errors may be detected while detecting the position of the pixel using the pattern recognition, and the detected errors may be corrected. Accordingly, there is an advantage in that the electronic pen's ability to detect the position of the pixel—i.e. the coordinate value corresponding to the pixel—can be improved. Particularly, if the pattern including the error correction marks according to the embodiment of the present invention is used, there is another advantage in that a success rate of detecting the coordinate increases.

Figure 13:
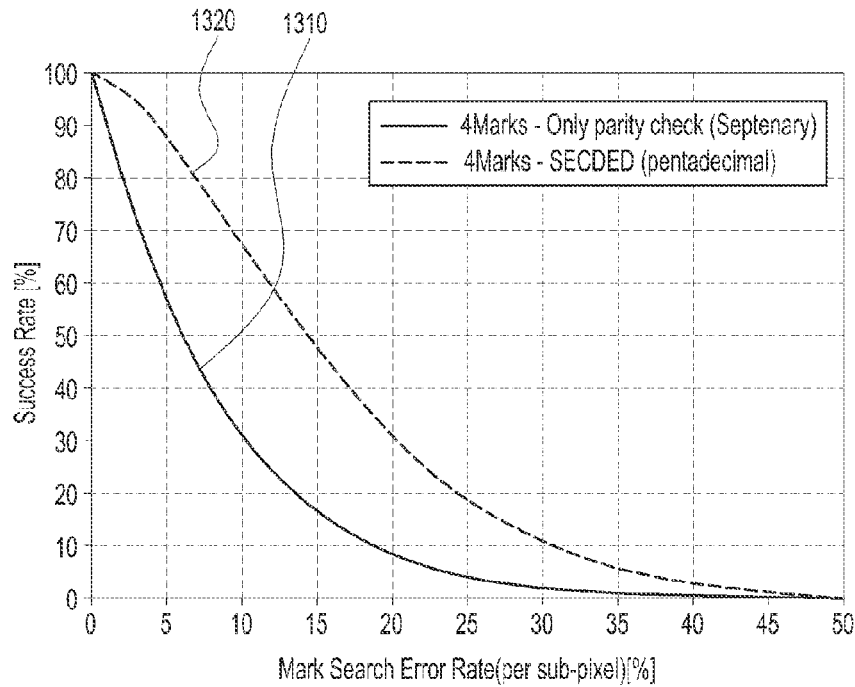
FIG. 13 is a graph illustrating a success rate of detecting each coordinate when a pattern according to the conventional art is used, and a success rate of detecting each coordinate when a pattern including error correction marks according to the embodiment of the present invention is used.

FIG. 13 is a graph illustrating a success rate of detecting each coordinate when a pattern according to the conventional art is used, and a success rate of detecting each coordinate when a pattern including error correction marks according to the embodiment of the present invention is used. Referring to FIG. 13, an X-axis indicates a mark search error rate, and a Y-axis denotes a success rate of detecting the coordinate. Further, reference numeral 1310 indicates a curved line of the success rate to the mark search error rate when the position is detected by using the septenary numeral system and the pattern capable of only detecting errors, and reference numeral 1320 denotes a curved line of the success rate to the mark search error rate when the position is detected by using the pentadecimal numeral system and the pattern capable of correcting errors.

When using the septenary numeral system and the pattern capable of only detecting the errors, the success rate remarkably decreases as the mark search error rate per sub-pixel increases. However, when using the pentadecimal numeral system and the pattern capable of correcting the errors, although the mark search error rate increases, the success rate smoothly decreases. If the pattern including the error correction marks according to the embodiment of the present invention is used, accordingly, it will be noted that a success ratio of detecting the coordinate further increases.

Figure 14:
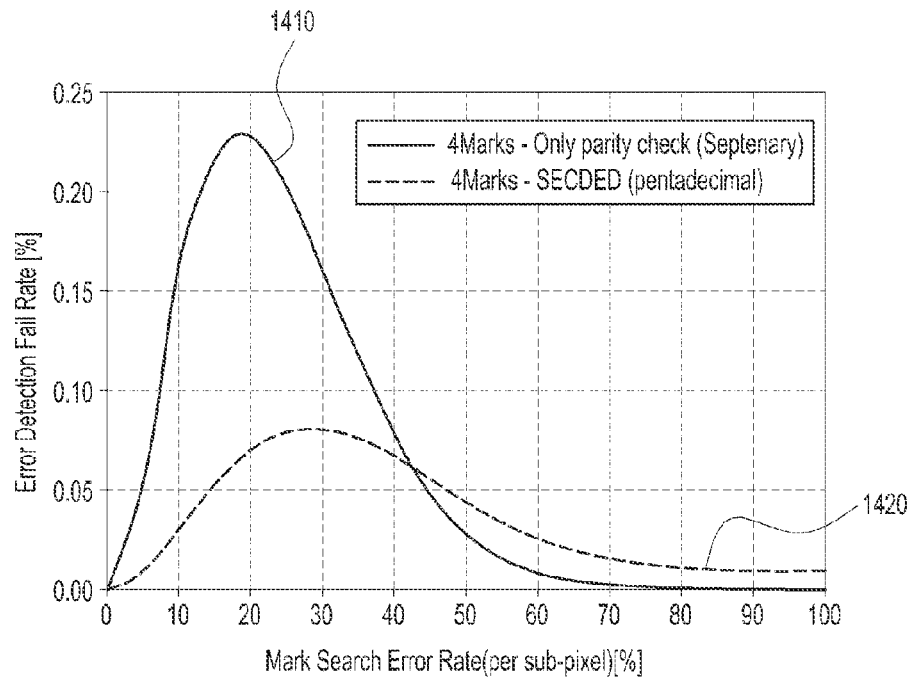
FIG. 14 is a graph illustrating an error detection failure rate when a pattern according to the conventional art is used, and an error detection failure rate when a pattern including error correction marks according to the embodiment of the present invention is used.

FIG. 14 is a graph illustrating an error detection fail rate when a conventional pattern is used, and an error detection fail rate when a pattern including error correction marks according to the embodiment of the present invention is used. Referring to FIG. 14, an X-axis indicates a mark search error rate, and a Y-axis denotes an error detection fail rate. Further, reference numeral 1410 indicates a curved line of the error detection fail rate to the mark search error rate when the position is detected by using the septenary numeral system and the pattern capable of only detecting errors, and reference numeral 1420 denotes a curved line of the error detection fail rate to the mark search error rate when the position is detected by using the pentadecimal numeral system and the pattern capable of correcting errors.

When using the septenary numeral system and the pattern capable of only detecting the errors, when the mark search error rate per sub-pixel is less than 43%, the error detection fail rate remarkably increases. However, when using the pentadecimal numeral system and the pattern capable of correcting the error, even when the mark search error rate per sub-pixel is less than 43%, the error detection fail rate slightly increases. It will be noted that the success rate of detecting the coordinate further increases when the pattern including the error correction mark according to the embodiment of the present invention is used.

Accordingly, by using the pattern including the error correction mark according to the embodiment of the present invention, the error can be corrected even though the error occurs during the detection of the mark in the sub-pixel. Further, the capability of detecting the position of the pixel while the error is detected can be remarkably improved.

Although a case of applying the present invention to a reference pattern of the 2×2 pixel has been described as an example in the description, the present invention may be applied to various reference pixels. For example, the pattern according to the embodiment of the present invention may be applied to various reference pixels of 2×3, 3×3, 4×4 and the like, while numbers of the marks included in the sub-pixels of the reference pixel may be changed accordingly. Further, if the numbers of the sub-pixels including the error correction mark are increased, the errors in the plural sub-pixels can be detected.

Accordingly, although specific embodiments are described in the above description of the present invention, various modifications may be carried out without departing from the scope of the present invention. Therefore, the scope of the present invention is not limited to the disclosed embodiments, but should be defined by equivalents to the appended claims.

What is claimed is:

1. A display device having a pattern, comprising:
a plurality of color filters which correspond to a plurality of sub-pixels constituting a pixel of the display device; and
a black matrix formed between the plurality of color filters, wherein the plurality of sub-pixels include a pattern comprising a plurality of position marks indicating an absolute position of each pixel of the display device, and a plurality of error correction marks for correcting an error and for determining whether the correction of the error is possible when the plurality of position marks are detected.

2. The display device as claimed in claim 1, wherein the plurality of position marks comprise one or more X coordinate marks and one or more Y coordinate marks.

3. The display device as claimed in claim 1, wherein the plurality of error correction marks have a value using a Hamming code.

4. The display device as claimed in claim 1, wherein the plurality of sub-pixels are divided into an upper portion and a lower portion respectively, and the plurality of position marks and the plurality of error correction marks are formed at the lower portion.

5. The display device as claimed in claim 1, wherein the plurality of position marks and the plurality of error correction marks are implemented by using pentadecimal numeral system with respect to a 2×2 pixel.

6. A method of detecting a position of a pixel in a display device having a pattern, the method comprising:
receiving an input of a display screen image captured by a camera to extract an effective pattern area for a recognition of a pattern from the display screen image;
detecting sub-pixels included in the effective pattern area so as to determine a plurality of sub-pixels including a pattern comprising a plurality of position marks indicating an absolute position of each pixel of the display device, and a plurality of error correction marks for correcting an error and for determining whether the correction of the error is possible;
determining a sub-pixel in which an error occurs among the plurality sub-pixels including the pattern of the plurality of position marks, by using the plurality of sub-pixels including the pattern of the plurality of position marks and the plurality of error correction marks;
correcting the error of the sub-pixel in which the error occurs, if the correction of the error is possible; and
calculating a display coordinate by using the pattern of the plurality of position marks included in the plurality of sub-pixels.

7. The method as claimed in claim 6, wherein the plurality of position marks comprise one or more X coordinate marks and one or more Y coordinate marks.

8. The method as claimed in claim 6, wherein the plurality of error correction marks have a value using a Hamming code.

9. The method as claimed in claim 6, wherein the plurality of sub-pixels are divided into an upper portion and a lower portion respectively, and the plurality of position marks and the plurality of error correction marks are formed at the lower portion.

10. The method as claimed in claim 6, wherein the plurality of position marks and the plurality of error correction marks are implemented by using pentadecimal numeral system with respect to a 2×2 pixel.

11. The display device as claimed in claim 1, wherein the plurality of sub-pixels further comprises one or more parity marks for detecting a sub-pixel in which the error occurs.

12. The method as claimed in claim 6, wherein the plurality of sub-pixels further comprises one or more parity marks for detecting the sub-pixel in which the error occurs.

* * * * *